United States Patent [19]

Gutierrez

[11] Patent Number: 5,341,589
[45] Date of Patent: * Aug. 30, 1994

[54] FISHING ROD HOLDER AND STAND

[76] Inventor: Manuel Gutierrez, 1273 Meadow Sweet Rd., Golden, Colo. 80401

[*] Notice: The portion of the term of this patent subsequent to Feb. 18, 2009 has been disclaimed.

[21] Appl. No.: 10,428

[22] Filed: Jan. 28, 1993

Related U.S. Application Data

[63] Continuation-in-part of Ser. No. 822,634, Jan. 17, 1992, Pat. No. 5,187,892, and a continuation-in-part of Ser. No. 649,677, Feb. 1, 1991, Pat. No. 5,088,224.

[51] Int. Cl.5 .................. A01K 97/10; A01K 97/12
[52] U.S. Cl. ............................................ 43/17; 43/21.2
[58] Field of Search ................................. 43/21.2, 17

[56] References Cited

U.S. PATENT DOCUMENTS

| | | | |
|---|---|---|---|
| 2,833,500 | 5/1958 | Jones | 248/42 |
| 2,900,153 | 8/1959 | Lazur | 248/44 |
| 3,973,346 | 8/1976 | Mason | 43/15 |
| 4,455,779 | 6/1984 | Cosic | 43/17 |
| 4,581,838 | 4/1986 | Moon | 43/17 |
| 4,877,165 | 10/1989 | Behrle | 43/21.2 X |
| 5,009,027 | 4/1991 | Lee | 43/21.2 |
| 5,016,384 | 5/1991 | Johnson | 43/21.2 |

FOREIGN PATENT DOCUMENTS

| | | | |
|---|---|---|---|
| 554898 | 10/1957 | France | 43/21.2 |
| 2253454 | 5/1975 | France | |

Primary Examiner—P. Austin Bradley
Assistant Examiner—Jeanne M. Elpel
Attorney, Agent, or Firm—Dean P. Edmundson

[57] ABSTRACT

A holder for a fishing rod that has a rearward rod handle support, a forward rod handle support, and a frame upon which the supports are mounted. The forward rod handle support has a first and second finger mounted for pivotal movement of their tips toward each other when a downward force is applied to a cable connecting the bottom end portions of the fingers. Also, a holder having a frame with a pair of rails, and downwardly depending legs secured to the rails. Additionally a holder with a frame and further including audible and visual alarms for making a signal when a fish strikes the line. Various types of stands are disclosed for supporting fishing rod holders.

8 Claims, 6 Drawing Sheets

FISHING ROD HOLDER AND STAND

CROSS-REFERENCE TO RELATED APPLICATION

This is a continuation-in-part of my copending U.S. patent application Ser. No. 07/822,634, filed Jan. 17, 1992, now U.S. Pat. No. 5,187,892, a continuation-in-part of my earlier U.S. patent application Ser. No. 07/649,677, filed Feb. 1, 1991, now U.S. Pat. No. 5,088,224.

BACKGROUND OF THE INVENTION

In general, this invention relates to devices for holding the end portions of cylindrical tubes and rods as well as portable stands capable of supporting such devices. More particularly, this invention relates to lightweight fishing rod holders with one or more of the following: an auto-hold-and-release mechanism, cable rod supports, a horizontal tilt-adjust mechanism, and a swivel strike indicator.

U.S. Pat. Nos. 3,570,793 issued to Shackel on 16 Mar. 1971; U.S. Pat. No. 2,573,635 issued to Williams on 30 Oct. 1951; U.S. Pat. No. 3,837,109 issued to DeJulio on 24 Sep. 1974; and U.S. Pat. No. 4,674,222 issued to Hughes on 23 Jun. 1987; U.S. Pat. No. 1,534,642 issued to Hoagland on 21 Apr. 1925; U.S. Pat. No. 2,553,231 issued to Bayto on 15 May 1951; U.S. Pat. No. 2,926,874 issued to Hahn on 1 Mar. 1960; and U.S. Pat. No. 567,084 issued to Eicher on 1 Sep. 1896 each disclose fishing rod support devices having fore and aft braces for rod handles. These devices are complex, unstable, or awkward to use. Shackel, Williams, Hoagland, Bayto, Hahn, and Eicher each disclose various attitude adjustment mechanisms. The TITE-LOK ® series 610 and 630 Rod Holders are upwardly open U-frames having an open-V at one end and a loop formed with the other end. Since the mounting brackets of the TITE-LOK ® Rod Holders cannot swivel, fishing rods held by these Rod Holders pull out of the open-V when either (a) a quick lateral or downward force is applied to the fishing line, such as that exerted by a strike, or (b) a more sustained lateral force is applied to the fishing rod held by the TITE-LOK ® Rod Holder.

None of the known rod holders are designed with a hold-and-release mechanism which allows an individual to, with a single hand, position a fishing rod therein and later release it. None of the known rod holders have a swivel strike indicator to minimize the risk of losing a fishing rod held thereby when a fish strikes a line, or when other quick lateral forces are applied to the fishing rod. No known self-supporting stands have the stability that the instant invention displays, and none are as compact and as easy to transport.

SUMMARY OF THE INVENTION

It is a primary object of this invention to provide a relatively lightweight and easy to use device that can effectively support and hold the end portions of cylindrical tubes and rods such as fishing rod handles. It is also an object of this invention to provide a stand for supporting a load such as a fishing rod holder. Still another object is to provide a fishing rod holder which includes an alarm system to signal a strike on the fishing line by a fish.

The advantages of providing devices as described herein are: (a) versatility—many fishing rod handle shapes and sizes can be accommodated; (b) the hold-and-release mechanism as designed more tightly grips a rod handle as greater force is exerted on it; (c) both the hold-and-release mechanism and the swivel strike indicator, independently and together, minimize the risk of losing a rod when a fish strikes a line or the rod is accidentally bumped; and (d) the simplicity of the holder and stand designs make them easy to operate and fabricate.

Briefly described, in one embodiment the invention includes a holder for a fishing rod that has a rearward rod handle support, a forward rod handle support, and a frame upon which the supports are mounted. The forward rod handle support has a first and second finger mounted for pivotal movement of their tips in unison toward each other when a downward force is applied to a cable connecting the bottom end portions of the fingers. The fishing rod holder comprises an integral steel rod which includes two downwardly depending legs which can be slidingly received in any of a variety of supports described herein. The versatile holders described herein can be mounted to various types of stands or any other portable or fixed support device in a number of manners.

Other stands and support devices are also described which enable fishing rod holders to be mounted and supported in a variety of manners.

BRIEF DESCRIPTION OF THE DRAWINGS

The invention will be more particularly described by referencing the accompanying drawings of the preferred embodiments, in which like numerals designate like parts.

DETAILED DESCRIPTION OF THE PREFERRED EMBODIMENTS

Figure 1:
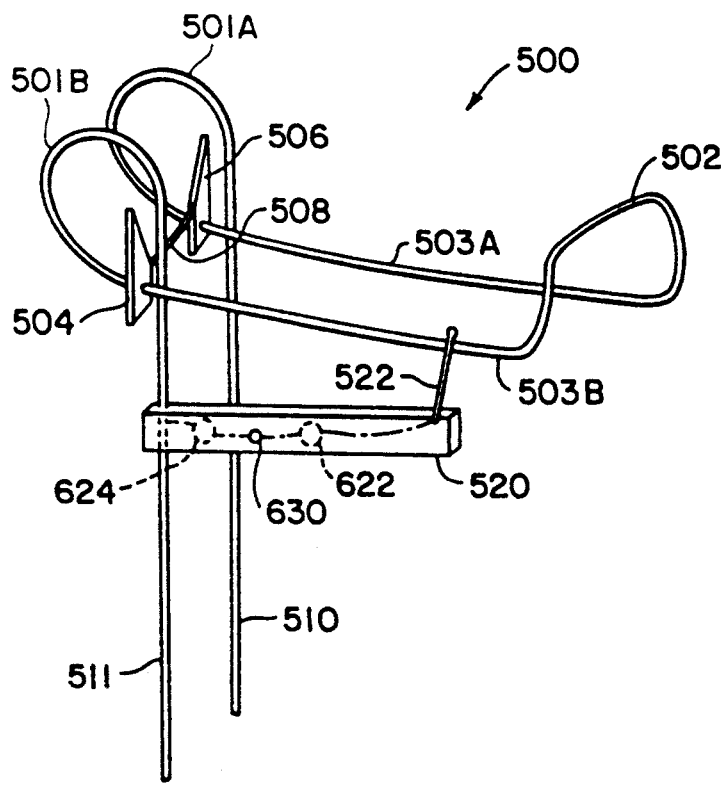
FIG. 1 is a perspective view of one embodiment of rod holder of the invention.
Figure 6:
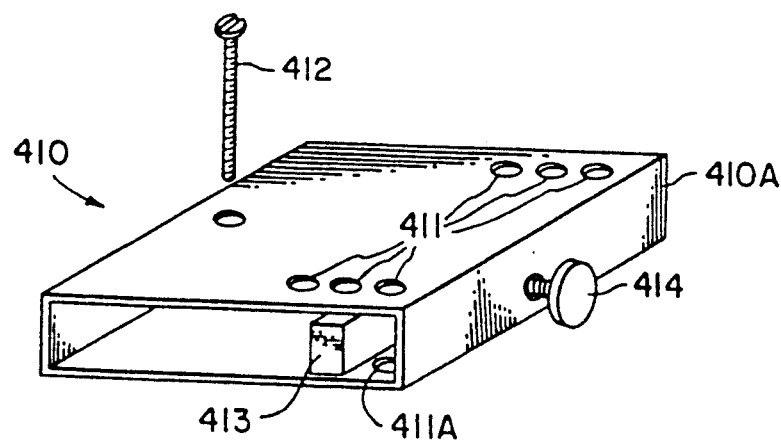
FIG. 6 is a perspective view of one embodiment of mounting block which is useful in this invention.

FIG. 1 illustrates an embodiment of rod holder 500 of the invention comprising a rearward rod handle support 502, a forward rod handle support comprising fingers 504 and 506 each having a tip and a bottom end portion, wherein the bottom end portions are connected by at least one cable 508. The fingers are mounted on arm or frame portions 503A and 503B for pivotal movement of the tips in unison toward each other when a downward force is applied to the cable. There are also spaced apart leg members 510 and 511 which extend downwardly (and preferably are parallel to each other). The leg members can be slidably received in and supported by a rod holder of the type shown in FIG. 6, for example. The rod holder 500 is preferably made of an integral piece or length of small gauge rod (e.g., rod having a diameter of about 0.12 inch). The rod holder 500 includes loops 501A and 501B, as illustrated, between the leg portions 510 and 511 and the frame portions 503A and 503B, respectively so as to impart more spring action to the rod holder.

Also included in rod holder 500 is an alarm system comprising a battery 622, a conventional audible signal means 624, a visual signal means 630 (e.g., an LED), a contact arm, and appropriate electrical contacts. Preferably the audible signal means comprises a buzzer, beeper or other such audible signal producing device. It is not necessary to include both an audible alarm and a visual alarm but it is preferred to include both (and to connect them in series). The alarm system is carried on arm 520 which is secured at one end to leg member 511. The battery, LED and buzzer are secured to arm 520. The lower end of contact arm 522 is also secured to arm 520. The free end of arm 522 extends upwardly and is positioned in close proximity to arm portion 503B.

Figure 2:
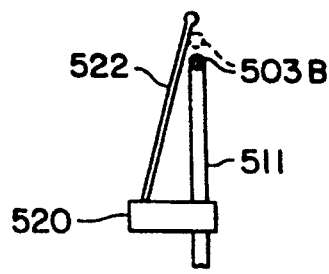
FIG. 2 is a rear elevational view showing the manner in which the alarm system is activated in the embodiment shown in FIG. 1.
Figure 3:
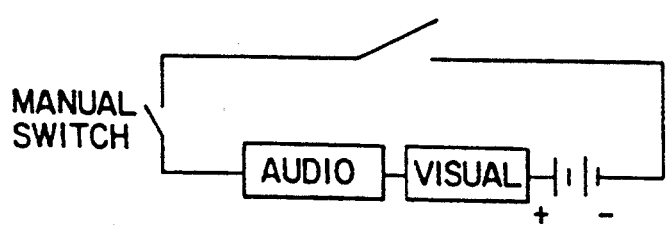
FIG. 3 is a schematic diagram of the audio alarm system which may be used in this invention.

The electrical circuitry of the alarm system is illustrated in the schematic diagram of FIG. 3. When contact arm 522 comes into contact with arm 503B (i.e., when a fish strikes a line carried by a fishing rod supported in the holder and causes leg members 510 and 511 to deflect slightly forward and rearward portion of arm 503B to deflect slightly upward), the electrical circuit is completed and the buzzer and the LED are activated. This is also illustrated in the elevational view of FIG. 2.

Cable 508 can be made of single or multiple strands or could be multiple link chains. The strands of a multiple strand cable could be woven or twisted, flat or circular cylindrical. Suitable sturdy cable materials include galvanized metals or alloys, nylon, reinforced plastic, fibers, or leather. The cable can be coated with an elastomeric material, or encased within vinyl or other flexible tubing or a mechanical spring, to protect a rod handle within the holder from damage.

Fingers 504 and 506 can be mounted so that their upper tips are located in offset spaced relationship to one another. This prevents them from colliding if rod handles with relatively small diameters are placed in the holder.

The lower ends of the leg members 510 and 511 can be received and supported in a variety of support means. For example, the leg members may be received in apertures or openings 411 in a mounting block 410 (which can in turn be secured to the upper end of a stand of the types shown in my copending U.S. patent application Ser. No. 07/822,634, now U.S. Pat. No. 5,187,892, incorporated herein by reference). The block is generally rectangular and includes a plurality of apertures, as shown, which extend through the upper port-].on of the block. A bolt 412 extends vertically through the block for the purpose of securing the block to the upper end of an upright stand or to any other desired support members. The base or lower portion of the block includes an aperture 411A therethrough on each of two opposite sides. A rod holder of the type which includes downwardly depending legs can be detachably supported in block 410. The legs of the rod holder can be inserted through two of the apertures 411 (one on each side of block 410) and then through apertures 411A in the base of the block. Bar 413 extends across the width of block 410 between the upper and lower portions of the block. Bolt 414 threadably engages bar 413. By tightening bolt 414, the bar is drawn against the legs of the rod holder to tightly secure them within the block.

The tilt of the legs of the rod holder relative to the block 410 is determined by which set of apertures 411 are used. For a vertical disposition, the legs are inserted through the set of apertures closest to the front edge 410A of the block. To obtain a rearward tilt for the rod holder relative to the block, the legs would be inserted through one of the other sets of apertures, as desired.

Figure 4:
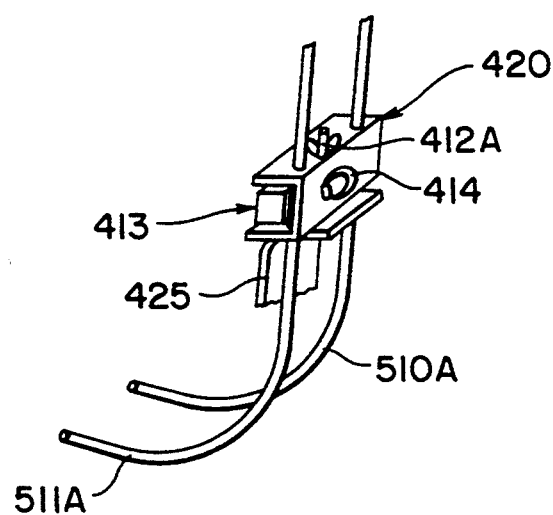
FIG. 4 is a perspective view illustrating the lower end of another embodiment of support legs which may be used in the rod holder of this invention.

As illustrated in FIG. 4, the lower ends of the leg members may be curved. In this manner, the tilt of the rod holder relative to a mounting block 420 may be adjusted, depending upon the position of the leg members in the mounting block when the bolt 414 is tightened. Bolt 412A passes through an aperture in the block for mounting the block on a support 425.

Figure 5A:
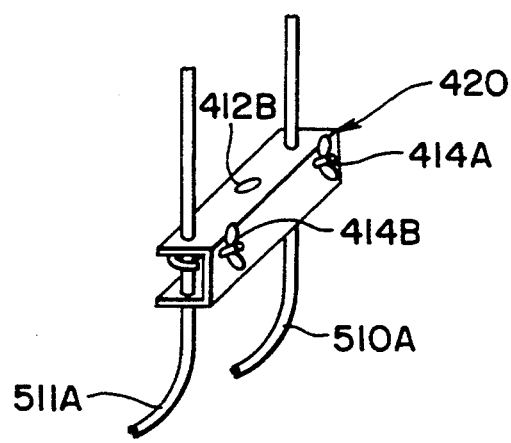
FIG. 5A illustrates another manner in which the legs of a rod holder may be mounted to a support.
Figure 5B:
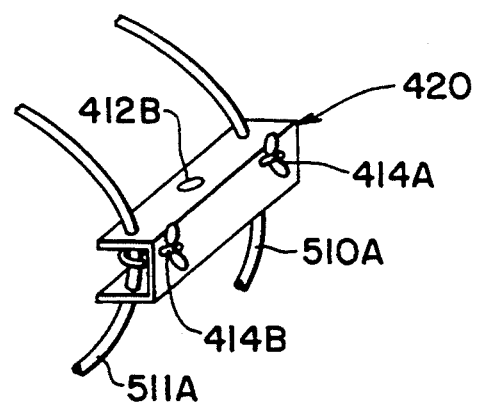
FIG. 5B illustrates one manner in which the position of support legs of a rod holder can be changed relative to a support.

FIGS. 5A and 5B illustrate two vertical positions of curved leg members 510A and 511A in another type of mounting block in which there is a separate J-bolt 414A and 414B for attaching or securing each leg member, respectively. The mounting block may be attached to a desired support by means of a bolt passing through opening 412B.

Figure 7:
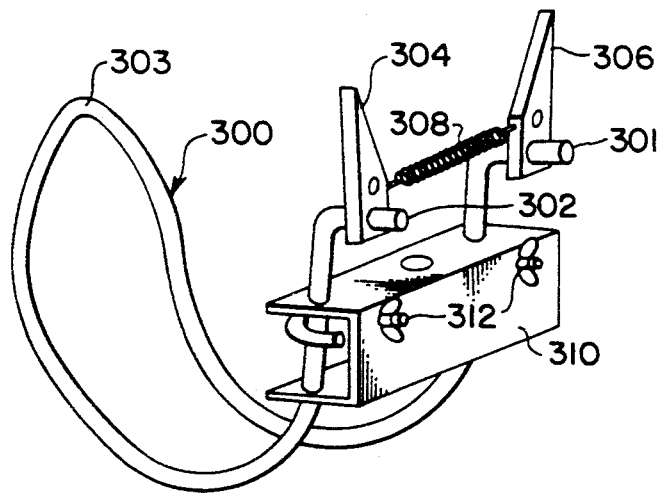
FIG. 7 is a perspective view of another embodiment of rod holder of the invention.

FIG. 7 illustrates another embodiment of rod holder for supporting a fishing rod. In this embodiment a curved U-shaped framework 300 includes a closed rearward end 303 and forward ends 301 and 302. The forward portion of the framework passes through openings in a mounting block 310. Bolts 312 secure the framework to the mounting block at any desired position. Because the framework is curved, the tilt of the framework relative to the mounting block may be adjusted, as desired. As illustrated, ends 301 and 302 are bent at a right angle so that they cannot escape the mounting block 310.

Fingers 304 and 306 are pivotably mounted respectively on the forward ends 302 and 301, as shown. Cable or spring member 308 is connected between the lower end portions of the fingers. When a downward force is applied to the cable, the tips of the fingers move in unison toward each other. Thus, when the handle of a fishing rod is supported in the holder, the free end of the handle passes through the framework and rests beneath the closed rearward end 303 of the holder. The forward portion of the handle rests upon cable 308, thereby causing the fingers 304 and 306 to move towards each other to grasp the handle. The mounting block 310 may be secured by means of a bolt or screw to any desired stand or support surface.

Figure 8:
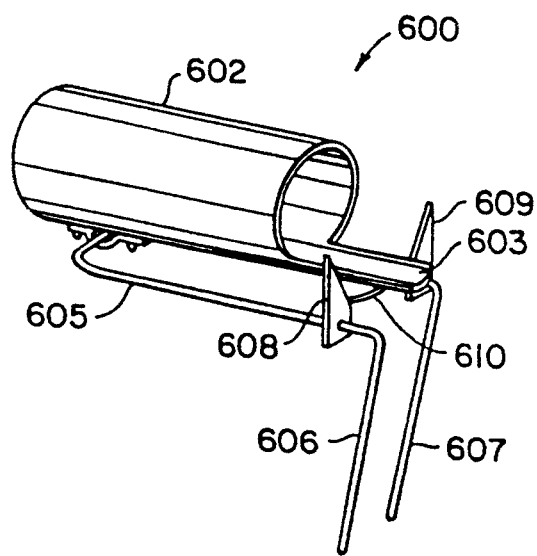
FIG. 8 is a perspective view of another embodiment of rod holder of the invention.

FIG. 8 is a perspective view showing another embodiment of rod holder 600 comprising a tubular receiver 602 for slidably receiving the handle of a fishing rod. The rearward portion of holder 602 is pivotably supported on the rearward portion of frame 605. The frame includes downwardly depending leg members 606 and 607 which can be slidably received in a suitable support stand (e.g., of the types shown in FIG. 6). Fingers 608 and 609 are pivotally mounted on the forward portions of the frame and are connected by a cable 610.

The forward end of receiver 602 includes a forwardly projecting leg 603 which extends between fingers 608 and 609 and over cable 610. When a fish strikes a line connected to a fishing rod supported in receiver 602, downward movement of the rod causes leg 603 to be pushed downwardly against cable 610. This causes the upper ends of fingers 608 and 609 to tip towards each other to firmly grasp the fishing rod handle.

While certain representative embodiments and details have been shown for the purpose of illustrating the invention, it will be apparent to those skilled in this art that various modifications may be made to the invention without departing from the spirit or scope of the invention. Still other types of rod holder supports may be used in this invention. In one further embodiment, for example, rod holders of the type having two downwardly extending legs may be supported in a stand wherein opposing plates (with grooved faces or including friction surfaces) are mounted to opposite sides of an upstanding post. When the plates are tightened to the post (e.g., by means of a bolt passing transversely through the assembly) the plates are prevented from moving relative to the post. The legs of the rod holder are attached or received in appropriate openings in the top surfaces of the plates. By loosening the bolt, the plates (and thus the rod holder) can be tilted or rotated relative to the post.

Figure 9:
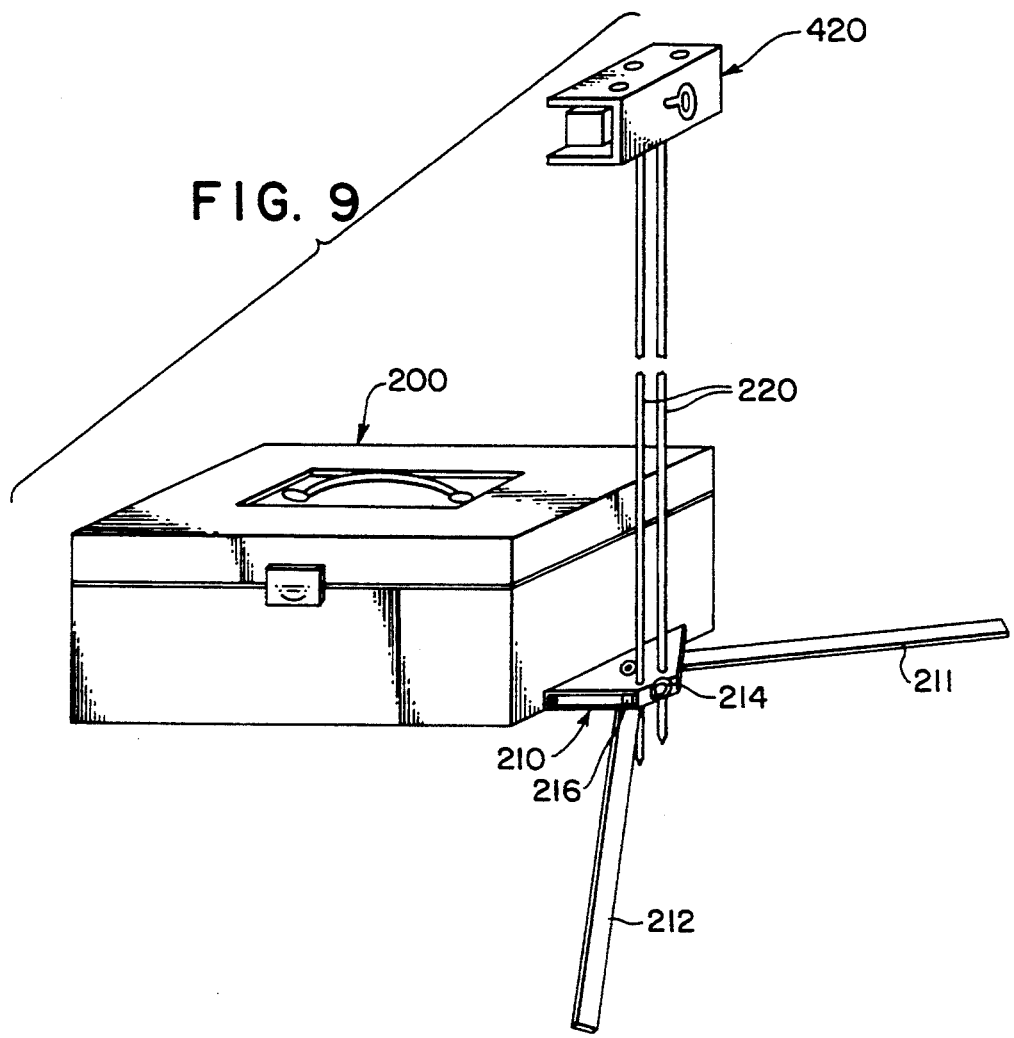
FIG. 9 is a perspective view illustrating another embodiment of a stand for a fishing rod holder.

FIG. 9 illustrates a tackle box 200 to which there is secured a support 210 for receiving leg members 220 of a stand for a fishing rod holder. Leg members 211 and 212 are pivotably mounted to the support in a horizontal plane for additional support for the tackle box. Bolt 214 passes through the front of the support 210 and threadably connected to bar 216 within the support. By tightening the bolt 214, the bar 216 is drawn against the legs 220 to secure them in a desired vertical position.

Figure 10:
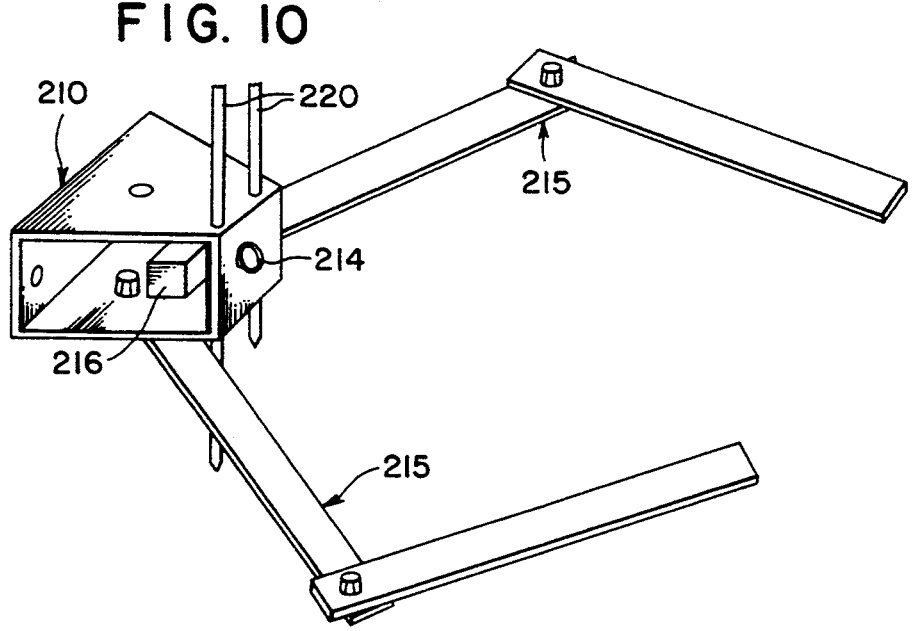
FIG. 10 is a perspective view of another embodiment of a stand which includes folding legs.

FIG. 10 also illustrates the support 210. In this embodiment, however, the leg members 215 are each comprised of two sections which are pivotably connected together so that the leg members can be folded. The support 210 can be secured to or mounted on any desired object or surface.

Figure 11:
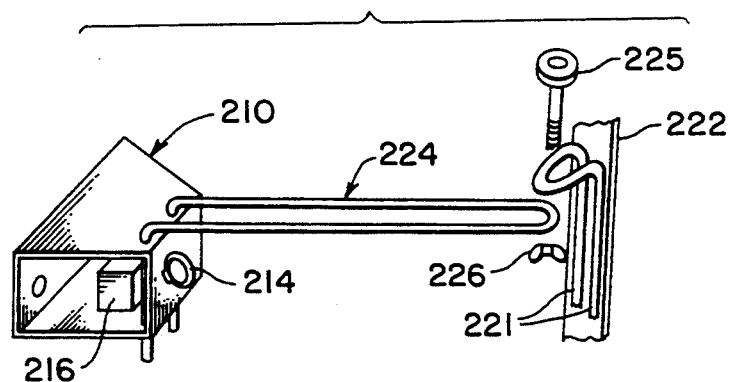
FIG. 11 is a perspective view illustrating one use of a stand for a fishing rod holder. holder.

FIG. 11 also shows support 210 in which a U-shaped rod 224 is mounted. A fishing rod stand 222 having leg members 221 may be attached to the rod 224 by means of bolt 225 and nut 226.

Figure 12:
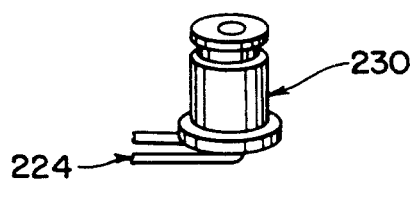
FIGS. 12 and 13 illustrate types of mounting blocks which may be used in this invention for supporting a fishing rod holder.

FIG. 12 shows a mounting block 230 secured to the rod 224. A fishing rod holder can be attached to block 230.

Figure 13:
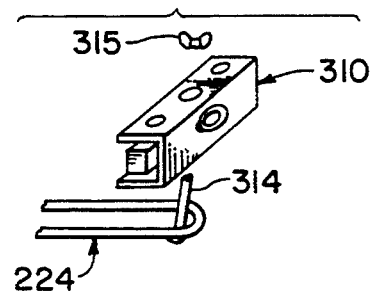

FIG. 13 shows a mounting block 310 which can be attached to the rod 224 by means of bolt 314 and nut 315. A fishing rod holder having downwardly depending legs can be received in the mounting block.

Figure 14:
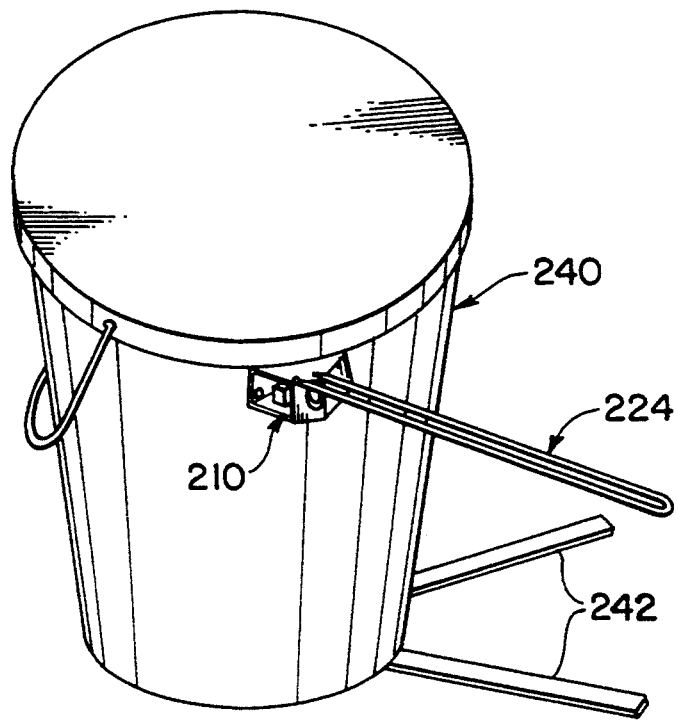
FIG. 14 illustrates use of a bucket to support a stand for a rod holder.
Figure 15:
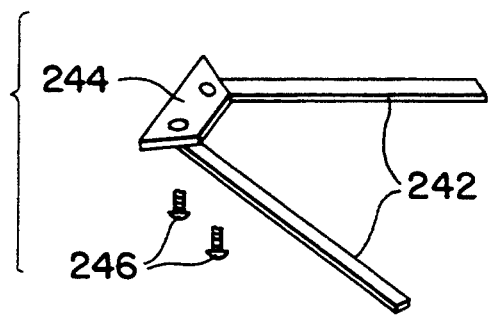
FIG. 15 shows one type of support system which may be used in this invention.

FIG. 14 shows support 210 secured to a bucket 240. A horizontal rod 224 is mounted in the support, as shown. A fishing rod holder or a fishing rod stand can be attached to rod 224. Leg members 242 can be secured to the base of the bucket. In FIG. 15 the leg members are shown attached to a mounting plate 244. Bolts or screws 246 can be used to mount the plate 244 to the bucket or other object.

Other variants are possible without departing from the scope of this invention.

What is claimed is:

1. A holder for a rod having a handle, comprising:
   (a) a rearward rod handle support;
   (b) a forward rod handle support comprising a first and second finger each having a tip and a bottom end portion, said bottom end portions being connected by at least one cable; wherein said fingers are mounted for pivotal movement of said tips in unison toward each other when a downward force is applied to said cable;
   (c) a frame upon which said rearward and forward rod handle supports are mounted; and
   (d) spaced-apart downwardly depending leg members carried by said frame.

2. The holder of claim 1, wherein said frame comprises a generally parallel pair of rails; wherein said bottom end portions of said first and second fingers are pivotally mounted on said rails, and wherein said rails, said rearward rod handle support, and said leg members are integral with each other.

3. A rod holder in accordance with claim 2, said holder further comprising a tubular receiver including an arm which extends forwardly thereof; wherein said arm extends over said cable; and wherein said tubular receiver is pivotally mounted to said frame.

4. The holder of claim 1, wherein said leg members are each connected to said frame by means of a loop.

5. The holder of claim 1, wherein said leg members include lower ends which are each curved in the same direction away from the longitudinal axis of said leg members.

6. The holder of claim 1, further comprising an alarm system comprising:
   (a) battery means;
   (b) signal means;
   (c) a contact arm;
wherein said signal means is operatively connected between said battery means and said contact arm such that said signal means is activated when said holder is deflected in a manner such that said contact arm closes an electrical circuit between said battery and said signal means.

7. The holder of claim 6, further comprising a support arm for supporting said battery means and said signal means, wherein said support arm is attached to one of said leg members; wherein said contact arm includes a first end which is secured to said support arm and a second which extends in close proximity to said frame; and wherein said contact arm contacts said frame when said holder is deflected.

8. A holder for a rod having a handle, comprising:
   (a) a curved U-shaped frame member including a rearward rod handle support and spaced-apart first and second forward ends;
   (b) first and second fingers which are mounted for pivotal movement on said first and second ends, respectively; wherein each said finger includes a tip and a bottom portion; wherein the bottom portions of said fingers are connected by means of a cable; wherein said tips of said fingers move towards each other when a downward force is applied to said cable.

* * * * *